United States Patent [19]

Gatwood

[11] Patent Number: 5,466,104
[45] Date of Patent: Nov. 14, 1995

[54] CARGO CUSHIONING APPARATUS

[76] Inventor: Millard E. Gatwood, 4151 Pace La., Pace, Fla. 32571

[21] Appl. No.: 92,966

[22] Filed: Jul. 19, 1993

[51] Int. Cl.⁶ .............................. B60P 7/18; B61D 45/00
[52] U.S. Cl. ...................... 410/156; 410/119; 410/125; 206/522; 137/355.12; 296/37.6
[58] Field of Search .......................... 410/117–119, 122, 410/125, 156; 206/522; 383/25; 137/355.12; 296/37.6; 220/507, 522

[56] References Cited

U.S. PATENT DOCUMENTS

| | | | |
|---|---|---|---|
| 2,856,867 | 10/1958 | Dasey | 410/119 |
| 3,240,408 | 3/1966 | Lapansie | 296/37.6 X |
| 3,462,027 | 8/1967 | Puckhaber | 206/522 |
| 3,753,414 | 8/1973 | Enochian | 410/119 |
| 3,847,091 | 11/1974 | Holt | 410/119 |
| 4,013,305 | 3/1977 | Ichihara | 280/742 |
| 4,043,572 | 8/1977 | Hattori et al. | 280/738 |
| 4,408,365 | 5/1978 | Johnson | 296/37.6 |
| 4,469,364 | 9/1984 | Rafi-Zapeh | 296/37.6 |
| 4,591,519 | 5/1986 | Liebel | 410/125 X |
| 4,632,446 | 12/1986 | Douglass | 296/37.6 |
| 4,733,898 | 3/1988 | Williams | 296/37.6 X |
| 4,865,345 | 9/1989 | Piegay | 280/602 |
| 4,957,250 | 9/1990 | Hararat-Tehrani | 410/118 X |
| 5,056,558 | 10/1991 | Rodgers | 410/125 X |
| 5,251,947 | 10/1993 | Kirila, II et al. | 296/37.6 X |
| 5,280,990 | 1/1994 | Rinard | 296/37.6 X |
| 5,303,866 | 4/1994 | Hawks, Jr. | 137/355.12 X |

Primary Examiner—Michael S. Huppert
Assistant Examiner—Stephen Gordon

[57] ABSTRACT

A new and improved cargo cushioning apparatus includes a plurality of selectively inflatable and deflatable air bags. Each air bag includes an air inlet, an air outlet, and a pressurized air supply assembly for inflating the air bags. The air inlet and the air outlet are in a combined air inlet/outlet. The pressurized air supply assembly includes a connector assembly for connecting to a source of pressurized air. A supply of a length of air hose is connected to the air supply connector assembly. An air dispensing valve is connected to the air hose. The air dispensing valve is adapted for connection to the respective air inlets on the respective air bags. A storage drum assembly may be employed for selectively storing and paying out a quantity of the air hose. The storage drum assembly is mounted on a truck. A storage container stores a plurality of the air bags when they are deflated. The storage container is installed in a cargo container, e.g. a trailer. A manifold assembly may be connected to the pressurized air supply assembly. The manifold assembly includes a plurality of individually controlled bag inflation modules. The respective bag inflation modules include respective independently controllable valves connected to a supply of pressurized air supplied by the hose from the pressurized air supply assembly. Respective air hoses are selectively connected to the respective valves. There is a one-to-one correspondence between respective inflation modules and respective air bags.

7 Claims, 4 Drawing Sheets

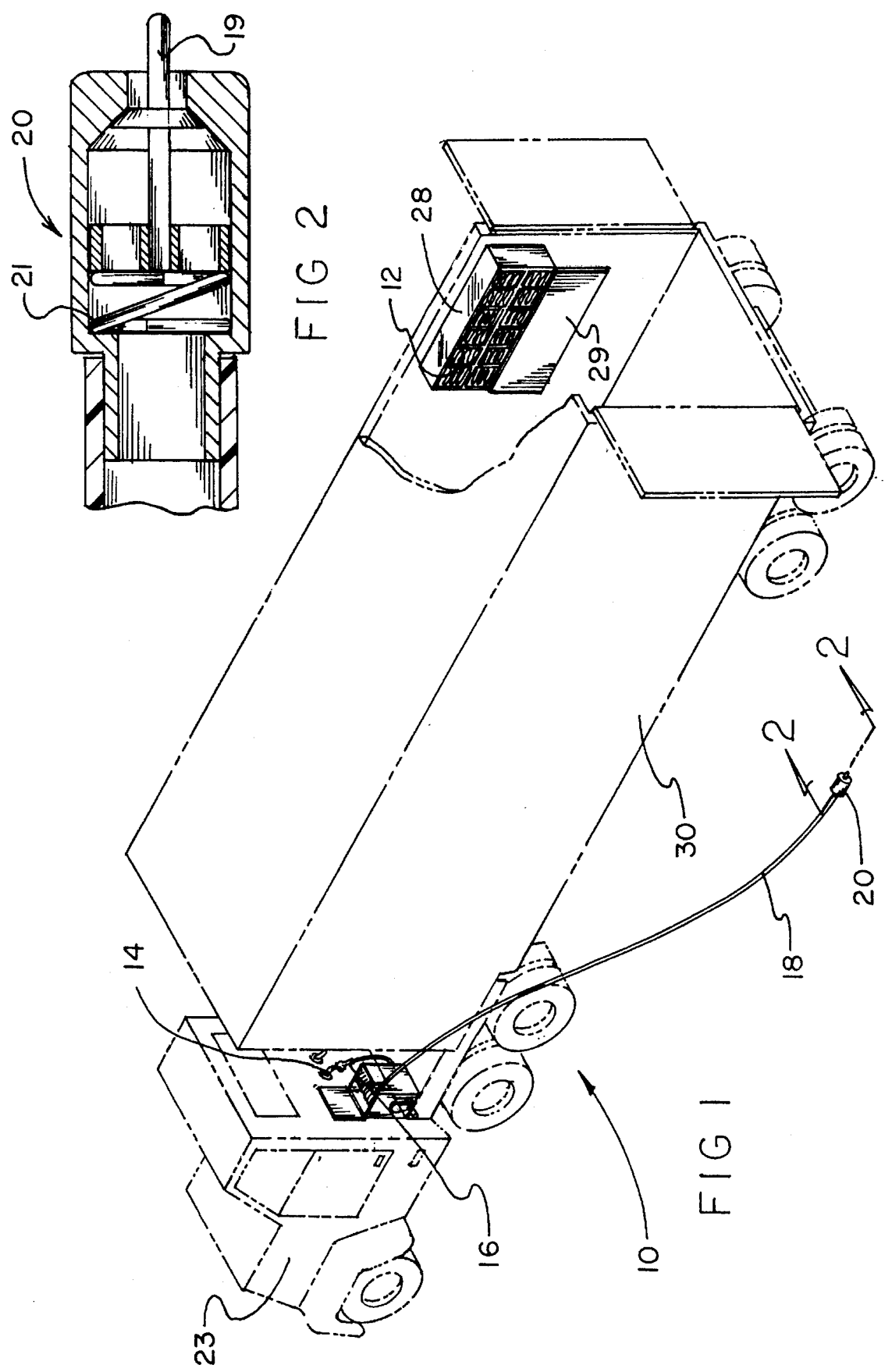

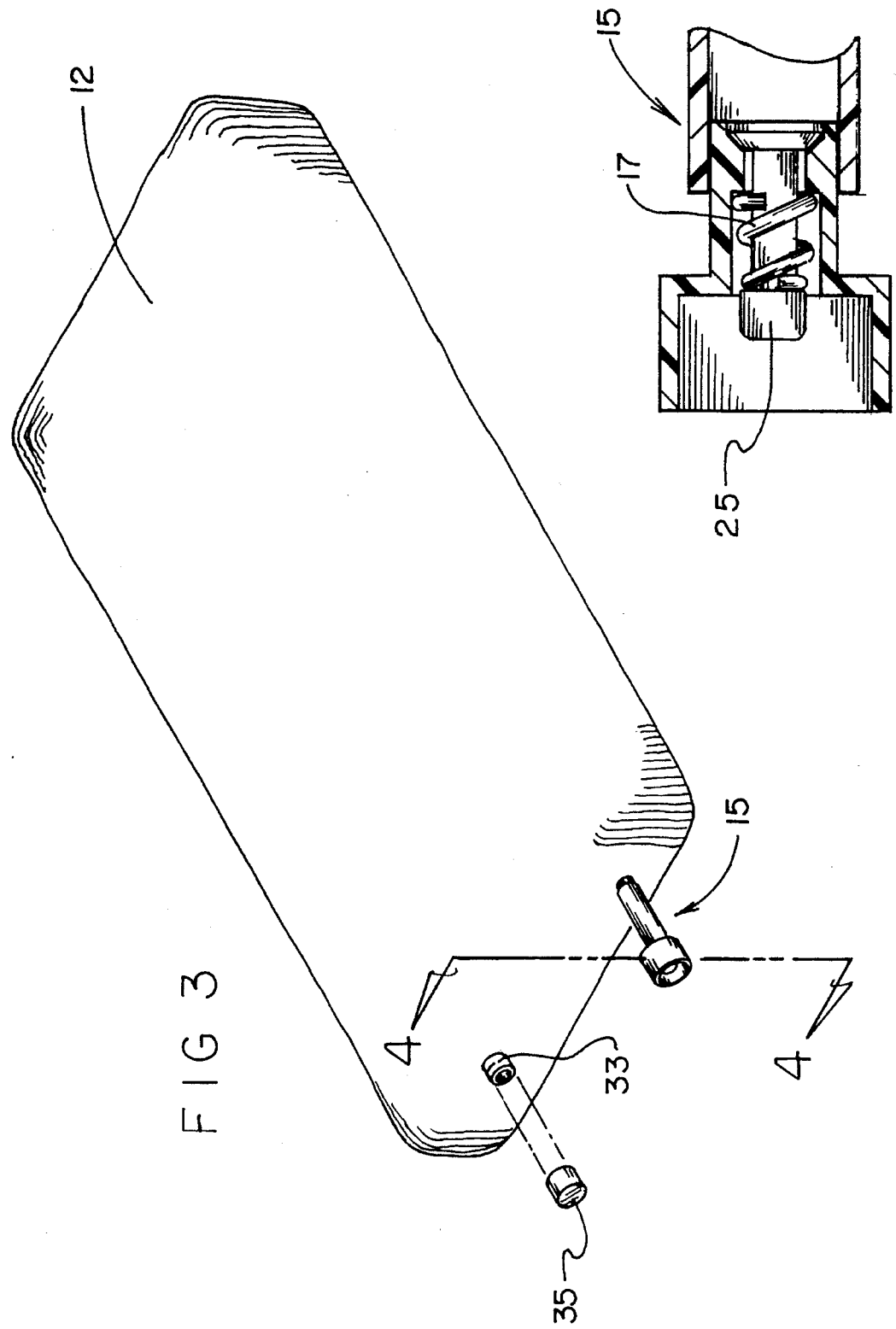

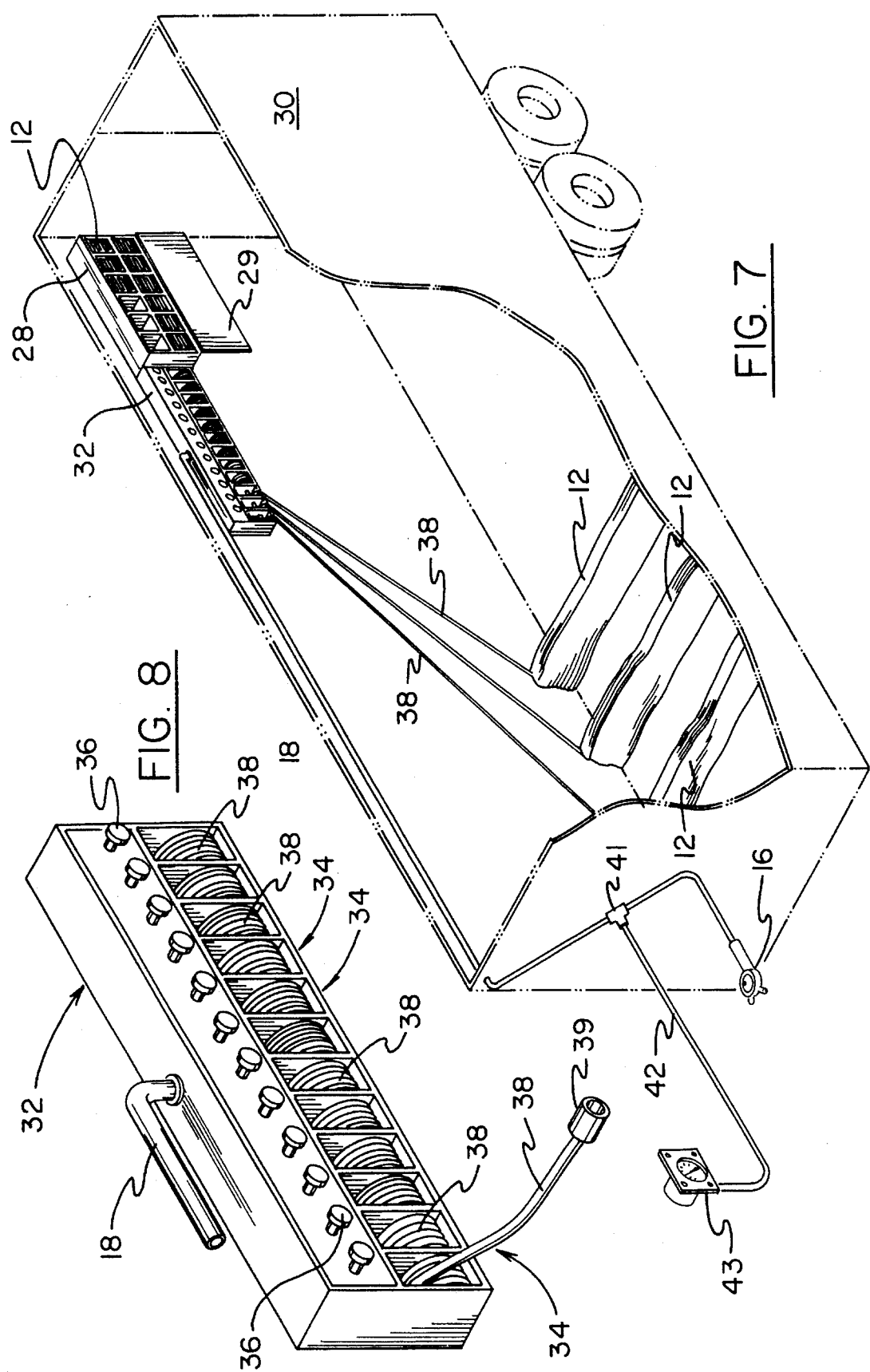

CARGO CUSHIONING APPARATUS

BACKGROUND OF THE INVENTION

1. Field of the Invention

The present invention relates generally to cargo containers and, more particularly, to devices especially adapted for protecting cargo in cargo containers from damage.

2. Description of the Prior Art

Shipping cargo from one place to another is a common activity in commerce. Cargo containers are used for transporting cargo by land, by sea, and by air. A common problem associated with all forms of cargo shipment is damage sustained by cargo due to shifting of the cargo in a cargo container and impact damage sustained by the shifted cargo. A common cause of cargo shifting is an abrupt stopping of a moving cargo container. In such a case, the container is stopped first, but the cargo, with its inertia, keeps moving. Individual cargo items eventually stop their movement when they bump up against other cargo items and the walls of the cargo containers.

By way of explanation, when the cargo undergoes transition from moving to stopped, the kinetic energy of the moving cargo must be absorbed. Taking a trailer being pulled by a truck as an example, when the truck and trailer undergo a controlled stop, the kinetic energy of the truck, the trailer, and the cargo are all absorbed by the brakes, the tires, and the road surface under the truck and trailer. In such a controlled stop, the overall system is slowed down in such a way that items of cargo remain in place in the trailer. On the other hand, in an abrupt stop, such as an emergency or panic stop, the brakes, the tires, and the road surface are no longer able to absorb all of the kinetic energy of the truck, the trailer, and the cargo. In such a case, the individual items of cargo often bump up against one another and the walls of the trailer. As the items if cargo bump each other and the trailer, their kinetic energy is absorbed, and often they sustain damage.

Throughout the years, a number of innovations have been developed relating to protecting cargo during shipment. A common protective scheme is to pack cargo with shock absorbent materials such as crumbled up newspaper. Such a protective method is extremely time consuming to employ and creates a lot of waste materials. In this respect, it would be desirable if a device for protecting cargo were provided which is not extremely time consuming to employ. In addition, it would be desirable if a device for protecting cargo were provided which does not create a lot of waste materials.

Another way to protect cargo is to use particles of plastic foam. This method creates quite a bit of waste materials. Moreover, because the particles are generally very small, an extensive clean up operation is required. In this respect, it would be desirable if a device for protecting cargo were provided which does not require an extensive clean up operation after use.

The concept of using cargo packing materials once and then discarding them is very wasteful of materials and money. In addition, such waste may be environmentally damaging. In this respect, it would be desirable if a device for protecting cargo were provided which can be used over and over again and does not create environmental damage.

In addition, the following U.S. patents disclose some additional innovations for protecting items being moved by common modes of transportation: U.S. Pat. Nos. 4,013,305; 4,043,572; 4,591,519; 4,865,345; and 4,957,250. More specifically, U.S. Pat. Nos. 4,013,305 and 4,043,572 disclose air bags that automatically inflate during an accident. U.S. Pat. No. 4,591,519 discloses a cargo air bag that includes an inflated air bag that is permanently laminated between sheets of plastic. U.S. Pat. No. 4,865,345 discloses a vibration damper for a ski. U.S. Pat. No. 4,957,250 discloses a permanent wall installed between a freight compartment and a passenger compartment in an aircraft.

The automatically inflatable air bags of U.S. Pat. Nos. 4,013,305 and 4,043,572 are not suitable for protecting cargo in a cargo container such as a trailer. Automatically inflatable are much too expensive. Moreover, a plurality of automatically inflating air bags that would inflate simultaneously in a confined space such as a trailer may contribute enormous pressures and be a cause, rather than a prevention, of cargo damage.

The laminated cargo air bag of U.S. Pat. No. 4,591,519 lacks quite a bit of versatility. Because the air cannot be added to or deleted from the laminated air bag when desired, the bag may not be suitable for load extremes, that is light items of cargo at times and heavy items of cargo at other times. In this respect, it would be desirable if a device for protecting cargo were provided which included air as a cushioning material and that was adjustable as to the amount of air contained within the device. U.S. Pat. No. 4,865,345 is similar to U.S. Pat. No. 4,591,519 in the sense that it also employs absorbent material that is part of a permanent laminated structure. U.S. Pat. No. 4,957,250 discloses a permanent fixed wall. Such is not practical in a cargo container such as a trailer where positioning between items of cargo can be in virtually an infinite number of patterns. In this respect, it would be desirable if a device for protecting cargo were provided which can be placed with a cargo container in a substantially infinite number of positions.

Still other features would be desirable in a cargo cushioning apparatus. For a trailer, for example, it would be desirable if a cargo cushioning apparatus could be readily stored, used, and placed again in storage in the trailer. In this respect, it would be desirable if the cargo cushioning apparatus took up relatively little space when stored. It would be desirable if a cargo cushioning apparatus were easily deployed in a trailer or other cargo container. It would also be desirable if a cargo cushioning apparatus used the free, recyclable atmospheric air for cushioning. It would also be desirable if a cargo cushioning apparatus used a motorized air pump for inflating the air-containing cushions. In this respect, it would be desirable if a cargo cushioning apparatus used the power of a truck motor to pump air into air-containing cushions in a cargo cushioning apparatus.

Thus, while the foregoing body of prior art indicates it to be well known to use devices for protecting cargo within cargo containers, the prior art described above does not teach or suggest a cargo cushioning apparatus which has the following combination of desirable features: (1) is not extremely time consuming to employ; (2) does not create a lot of waste materials; (3) does not require an extensive clean up operation after use; (4) can be used over and over again and does not create environmental damage; (5) includes air as a cushioning material and is adjustable as to the amount of air contained within the device; (6) can be placed within a cargo container in a substantially infinite number of positions; (7) can be readily stored, used, and placed again in storage in the trailer; (8) takes up relatively little space when stored; (9) is easily deployed in a trailer or other cargo container; (10) use the free, recyclable atmospheric air for cushioning; (11) uses a motorized air pump for inflating the air-containing cushions; and (12) uses the power of a truck motor to pump air into air-containing cushions. The foregoing desired characteristics are provided by the unique cargo cushioning apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved cargo cushioning apparatus which includes a plurality of selectively inflatable and deflatable air bags. Each air bag includes an air inlet, an air outlet, and a pressurized air supply assembly for inflating the air bags. The air inlet and the air outlet are in a combined air inlet/outlet. The pressurized air supply assembly includes a connector assembly for connecting to a source of pressurized air. A supply of a length of air hose is connected to the air supply connector assembly. An air dispensing valve is connected to the air hose. The air dispensing valve is adapted for connection to the respective air inlets on the respective air bags.

A storage drum assembly may be employed for selectively storing and paying out a quantity of the air hose. The storage drum assembly includes a drum element, a housing for storing the drum element, and a hand-crank for rotating the drum element within the housing for selectively winding and unwinding air hose from the drum element.

The storage drum assembly is mounted on a truck. A storage container stores a plurality of the air bags when they are deflated. The storage container is installed in a cargo container. The cargo container is a trailer.

A manifold assembly may be connected to the pressurized air supply assembly. The manifold assembly includes a plurality of individually controlled bag inflation modules. The respective bag inflation modules include respective independently controllable valves connected to a supply of pressurized air supplied by the hose from the pressurized air supply assembly. Respective air hoses are connected to the respective valves.

There is a one-to-one correspondence between respective inflation modules and respective air bags.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved cargo cushioning apparatus which has all of the advantages of the prior art and none of the disadvantages.

It is another object of the present invention to provide a new and improved cargo cushioning apparatus which may be easily and efficiently manufactured and marketed.

It is a further object of the present invention to provide a new and improved cargo cushioning apparatus which is of durable and reliable construction.

An even further object of the present invention is to provide a new and improved cargo cushioning apparatus which is susceptible of a low cost of manufacture with regard to both materials and labor, and which accordingly is then susceptible of low prices of sale to the consuming public, thereby making such cargo cushioning apparatus available to the buying public.

Still yet a further object of the present invention is to provide a new and improved cargo cushioning apparatus which is not extremely time consuming to employ.

Still another object of the present invention is to provide a new and improved cargo cushioning apparatus that does not create a lot of waste materials.

Yet another object of the present invention is to provide a new and improved cargo cushioning apparatus which does not require an extensive clean up operation after use.

Even another object of the present invention is to provide a new and improved cargo cushioning apparatus that can be used over and over again and does not create environmental damage.

Still a further object of the present invention is to provide a new and improved cargo cushioning apparatus which includes air as a cushioning material and is adjustable as to the amount of air contained within the device.

Yet another object of the present invention is to provide a new and improved cargo cushioning apparatus that can be placed within a cargo container in a substantially infinite number of positions.

Even another object of the present invention is to provide a new and improved cargo cushioning apparatus which can be readily stored, used, and placed again in storage in the trailer.

Yet another object of the present invention is to provide a new and improved cargo cushioning apparatus that takes up relatively little space when stored.

Still a further object of the present invention is to provide a new and improved cargo cushioning apparatus that is easily deployed in a trailer or other cargo container.

Yet another object of the present invention is to provide a new and improved cargo cushioning apparatus which use the free, recyclable atmospheric air for cushioning.

Still a further object of the present invention is to provide a new and improved cargo cushioning apparatus that uses a motorized air pump for inflating the air-containing cushions.

Yet another object of the present invention is to provide a new and improved cargo cushioning apparatus which uses the power of a truck motor to pump air into air-containing cushions.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first preferred embodiment of the cargo cushioning apparatus of the invention installed on a truck and trailer; wherein a quantity of pressurized air line is stored on the truck; and wherein a number of deflated air bags are stored in a storage compartment in the trailer.

FIG. 2 is an enlarged cross-sectional view of an air flow control valve along line 2—2 of FIG. 1.

FIG. 3 is an enlarged perspective view of an air bag that has been removed from the storage compartment in the trailer in FIG. 1 that has been inflated.

FIG. 4 is an enlarged cross-sectional view of a check valve on the inflated air bag of FIG. 3 taken along line 4—4 of FIG. 3.

FIG. 7 is a perspective view of a second embodiment of the cargo cushioning apparatus of the invention wherein a manifold of pressurized air lines and a storage compartment for deflated air bags are contained in the trailer.

FIG. 8 is an enlarged perspective view of the pressurized air manifold shown in FIG. 7.

DESCRIPTION OF THE PREFERRED EMBODIMENT

With reference to the drawings, a new and improved cargo cushioning apparatus embodying the principles and concepts of the present invention will be described.

Figure 6:
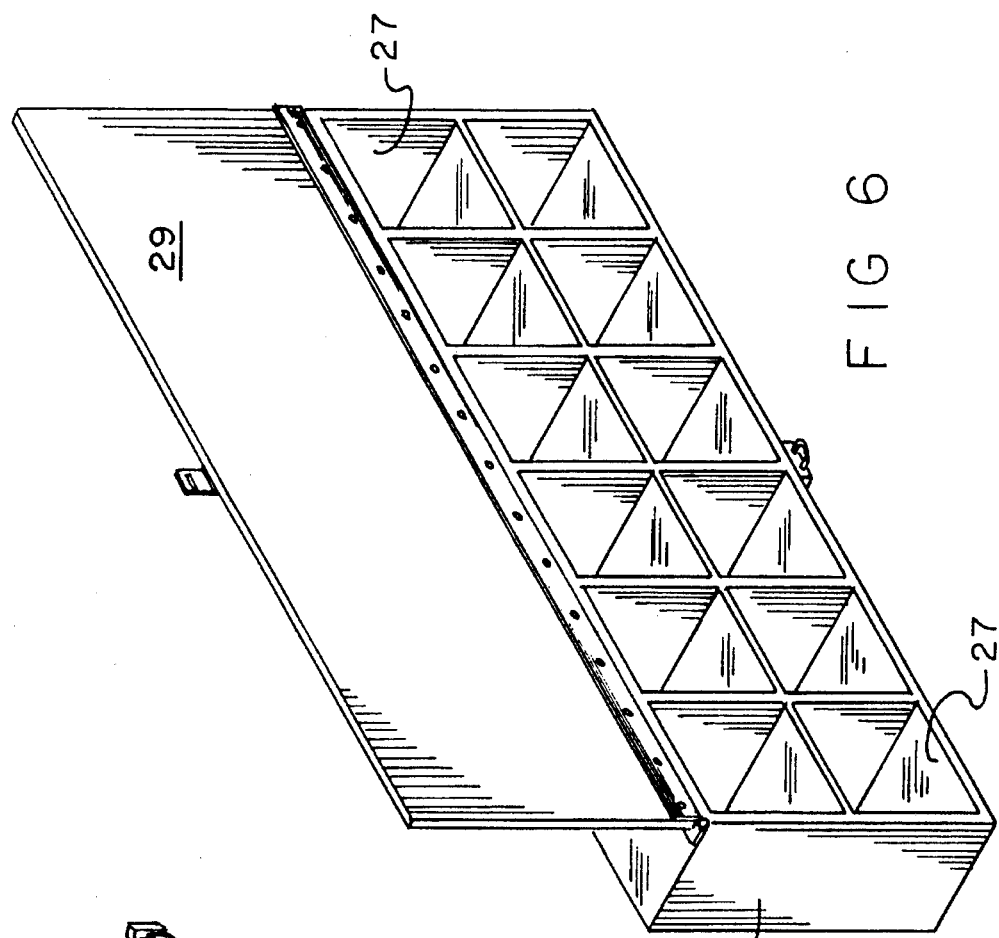
FIG. 6 is an enlarged perspective view of an empty storage compartment for storing a plurality of deflated air bags in the trailer as shown in FIG. 1.
Figure 5:
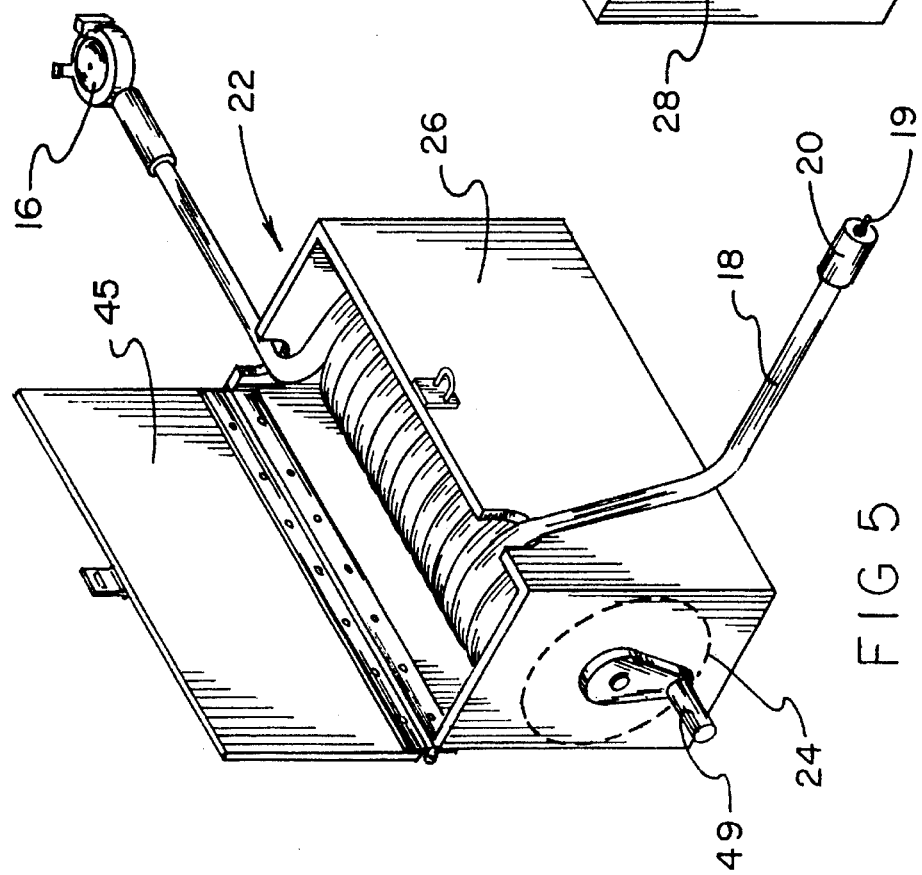
FIG. 5 is an enlarged perspective view of a storage compartment for storing a quantity of pressurized air line as shown on the truck in FIG. 1.

Turning initially to FIGS. 1–6, there is shown a first exemplary embodiment of the cargo cushioning apparatus of the invention generally designated by reference numeral 10. In its preferred form, cargo cushioning apparatus 10 includes a plurality of selectively inflatable and deflatable air bags 12. The air bags 12 can be made of a durable plastic or rubber composition. Each air bag 12 includes an air inlet, an air outlet, and a pressurized air supply assembly for inflating the air bags 12. The air inlet and the air outlet are in a combined air inlet/outlet 15. The pressurized air supply assembly includes a connector assembly 16 for connecting to a source of pressurized air 14. The source of pressurized air is an air pump driven by the engine of the truck 23. A supply of a length of air hose 18 is connected to the air supply connector assembly 16. An air dispensing valve 20 is connected to the air hose 18. The air dispensing valve 20 is adapted for connection to the respective air inlets on the respective air bags 12.

The combined inlet/outlet 15 on an air bag 12 includes a valve assembly that is biased shut by a spring 17. The valve assembly of the inlet/outlet 15 also includes a ram element 25. The air dispensing valve 20 also includes a valve assembly that is biased shut by a spring 21. The air dispensing valve 20 also includes a plunger 19.

In operation, in inflation of the air bag 12, the plunger 19 in the air dispensing valve 20 is placed against the ram element 25 in the combined inlet/outlet 15. Then the air dispensing valve 20 is pushed toward the combined inlet/outlet 15. In doing so, the plunger 19 pushes against the ram element 25. When the plunger 19 is pushed against the ram element 25, the respective biases of spring 17 and spring 21 are both overcome, and air has an unobstructed flow path from the pressurized air assembly, through the air dispensing valve 20, through the inlet/outlet 15, and into the air bag 12.

To deflate an air bag 12, the air dispensing valve 20 is disconnected from the inlet/outlet 15, and the ram element 25 is manually pressed. In this way, the valve is opened, and air can pass out of the air bag 12 into the atmosphere. The air bags 12 are deflated prior to their being rolled up or folded up and being placed in a storage container 28.

A storage; drum assembly 22 is employed for selectively storing and paying out a quantity of the air hose 18. The storage drum assembly 22 includes a drum element 24, a housing 26 for storing the drum element 24, and an handcrank 49 for rotating the drum element 24 within the housing 26 for selectively winding and unwinding air hose 18 from the drum element 24.

A hinged lid 45 is also provided on the storage drum assembly 22. The storage drum assembly 22 is mounted on a truck 23. A storage container 28 stores a plurality of the air bags 12 when they are deflated. The storage container 28 has a hinged lid 29 which is shown in an open position in FIG. 1. The storage container 28 also includes a plurality of storage cubicles 27. Each cubicle 27 receives a respective deflated air bag 12. The storage container 28 is installed in a cargo container. The cargo container is a trailer 30.

Turning to FIGS. 7–8, a second embodiment of the invention is shown. Reference numerals are shown that correspond to like reference numerals that designate like elements shown in the other figures. In addition, a manifold assembly 32 is connected to the pressurized air supply assembly. The manifold assembly 32 includes a plurality of individually controlled bag inflation modules 34. The respective bag inflation modules 34 include respective independently controllable valves 36 connected to a supply of pressurized air supplied by the hose 18 from the pressurized air supply assembly. Respective air hoses 38 are connected to the respective valves 36. The air bags 12 are equipped with auxiliary openings 33 for connecting with the air hoses 38 from the manifold assembly 32 to receive air therefrom for inflation. The air hoses 38 are equipped with fittings 39 which are adapted to connect with the auxiliary openings 33 for inflating the air bags 12 through the auxiliary openings 33. A cap 35 can be placed over an auxiliary opening 33 for sealing air in the air bag 12. Alternatively, the cap 35 can be removed to allow air to exit from the air bag 12 when deflation takes place.

Through a T-connection 41 in the air hose 18, a hose 42 and a pressure gauge 43 are fitted.

There is a one-to-one correspondence between respective inflation modules 34 and respective air bags 12. In FIG. 7, there are twelve inflation modules 34 for twelve air bags 12.

Each respective valve 36 is individually controllable, and each respective air bag 12 can be inflated to an individually selected degree of inflation. Selective inflation of each air bag 12 is controllable from one location, the manifold assembly 32. It is also noted that each air bag 12 in the embodiment shown in FIG. 1 is also individually inflated. To inflate each air bag 12 individually, a person doing so must carry the air dispensing valve 20 to each air bag 12 in succession.

The components of the cargo cushioning apparatus of the invention can be made from inexpensive and durable plastic or rubber materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved cargo cushioning apparatus that is low in cost, relatively simple in design and operation, and which may advantageously be used to cushion cargo without being extremely time consuming to employ. With the invention, a cargo cushioning apparatus is provided which does not create a lot of waste materials. With the invention, a cargo cushioning apparatus is provided which does not require an extensive clean up operation after use. With the invention, a cargo cushioning apparatus is provided which can be used over and over again and does not create environmental damage. With the invention, a cargo cushioning apparatus is provided which includes air as a cushioning material and is adjustable as to the amount of air contained within the device. With the invention, a cargo cushioning apparatus is provided which can be placed within a cargo container in a substantially infinite number of positions. With the invention, a cargo cushioning apparatus is provided which can be readily stored, used, and placed again in storage in the trailer. With the invention, a cargo cushioning apparatus is provided which takes up relatively little space when stored. With the invention, a cargo cushioning apparatus is provided which is easily deployed in a trailer or other cargo container. With the invention, a cargo cushioning apparatus is provided which use the free, recyclable atmospheric air for cushioning. With the invention, a cargo cushioning apparatus is provided which uses a motorized air pump for inflating the air-containing cushions. With the invention, a cargo cushioning apparatus is provided which uses the power of a truck motor to pump air into air-containing cushions.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved cargo cushioning apparatus, comprising:

a plurality of selectively inflatable and deflatable air bags, each air bag including an air inlet and air outlet, a pressurized air supply assembly for inflating said air bags, wherein each of said air bags is adapted to be folded up when deflated, a storage container for storing a plurality of said air bags when they are deflated and folded up, wherein said storage container is adapted to be installed in a cargo container, wherein said storage container includes a plurality of storage cubicles, each storage cubicle being adapted to receive a respective deflated and folded up air bag, and a manifold assembly connected to said pressurized air supply assembly, said manifold assembly including a plurality of individually controlled bag inflation modules, wherein said respective bag inflation modules include respective independently controllable valves connected to a supply of pressurized air supplied from said pressurized air supply assembly and include respective air hoses connected to said respective valves, wherein there is a one-to-one correspondence between respective inflation modules and respective air bags.

2. The apparatus described in claim 1 wherein said air inlet and said air outlet are in a combined air inlet/outlet.

3. The apparatus described in claim 1 wherein said pressurized air supply assembly includes:

a connector assembly for connecting to a source of pressurized air, a supply of air hose connected to said connector assembly, and an air dispensing valve connected to said supply of air hose, wherein said air dispensing valve is adapted for connection to each said air inlet on said respective air bags.

4. The apparatus described in claim 3, further including:

a storage drum assembly for selectively storing and paying out a quantity of said supply of air hose, wherein said supply of air hose is wrapped around said storage drum assembly when said supply of air hose is stored.

5. The apparatus described in claim 4 wherein said storage drum assembly includes a drum element, a housing for storing said drum element, and a hand-crank for rotating said drum element within said housing for selectively winding and unwinding air hose from said drum element.

6. The apparatus described in claim 4 wherein said storage drum assembly is adapted to be mounted on a truck.

7. The apparatus described in claim 1 wherein the cargo container is a trailer.

\* \* \* \* \*